United States Patent [19]

Lindkvist

[11] 4,058,299

[45] Nov. 15, 1977

[54] APPARATUS FOR REMOVING POLLUTING MATTER ARISING IN FLAME CUTTING AND LIKE OPERATIONS

[76] Inventor: Erik Allan Lindkvist, 38 Korpralsvagen, Umea, Sweden, S-902 53

[21] Appl. No.: 711,878

[22] Filed: Aug. 5, 1976

[30] Foreign Application Priority Data

Aug. 7, 1975 Sweden .............................. 7508895

[51] Int. Cl.² .............................................. B23K 7/02
[52] U.S. Cl. .................................. 266/48; 98/115 R; 239/288.5; 266/65
[58] Field of Search ..................... 98/115 R, 115 VM; 148/9 R; 239/288, 288.3, 288.5; 266/48, 49, 65

[56] References Cited

U.S. PATENT DOCUMENTS

| 3,008,514 | 11/1961 | Daly | 266/48 X |
| 3,526,395 | 9/1970 | Brown | 266/49 |
| 3,770,110 | 11/1973 | Boskovitch | 266/65 X |

FOREIGN PATENT DOCUMENTS 2,412,782  12/1974  Germany ....,......................... 266/65

*Primary Examiner*—Roy Lake
*Assistant Examiner*—Paul A. Bell

[57] ABSTRACT

An apparatus for removing polluting matter arising in flame cutting and like operations. In this apparatus a suction hood is associated with each cutter unit of a cutting assembly and connected to a suction device, an upwardly facing suction box disposed beneath the cutting table extends transversely of the width of the cutting table and is movable along it. The suction box is connected to the suction device and displaceable together with the cutting assembly with the aid of a device operable by sensing means sensing the position of the cutting assembly so that the suction box will be located beneath the working area of the cutting assembly. The movable suction box is provided with means for reducing the speed of jets directed from the flame cutters toward the interior of the suction box and laden with gases, fumes, dust, minute particles and like polluting matter.

9 Claims, 7 Drawing Figures

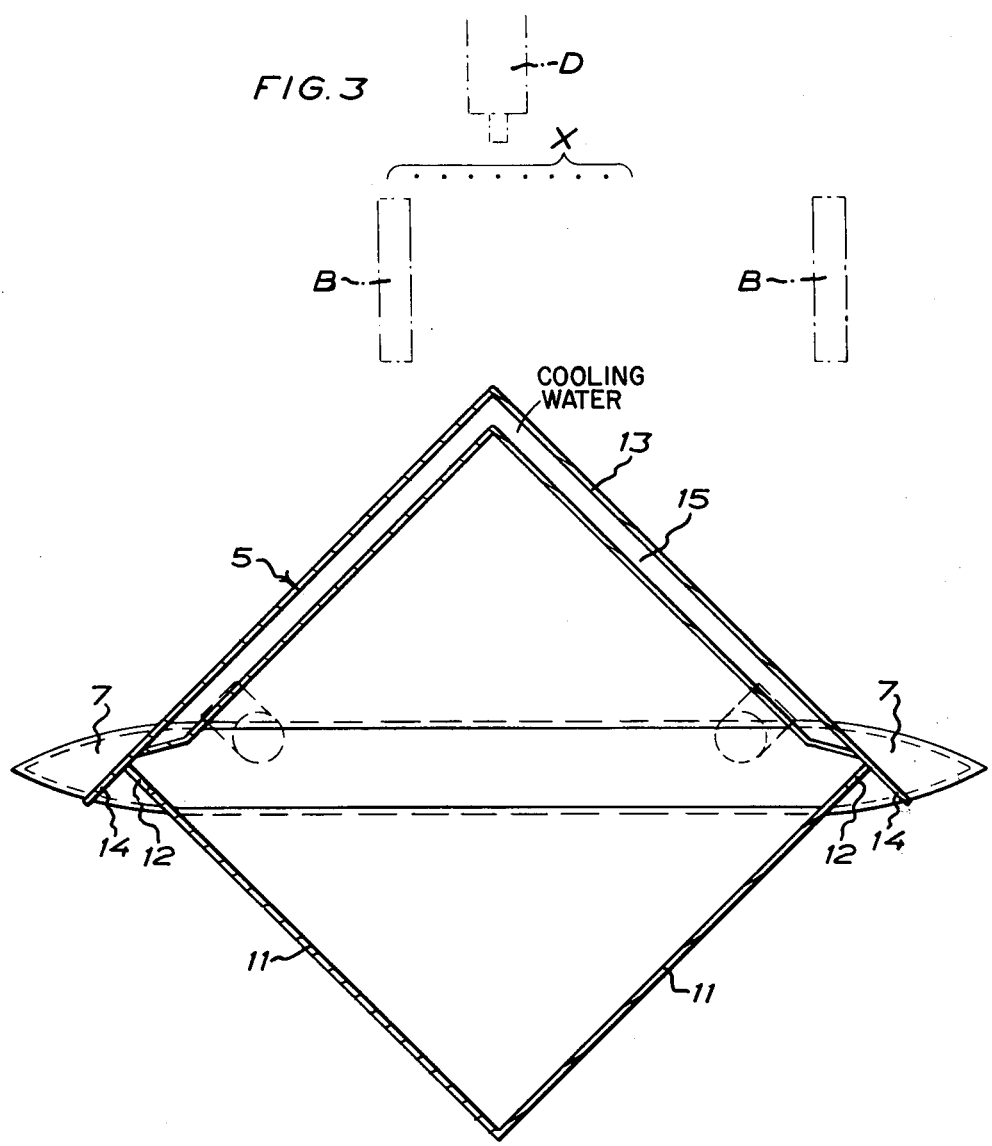

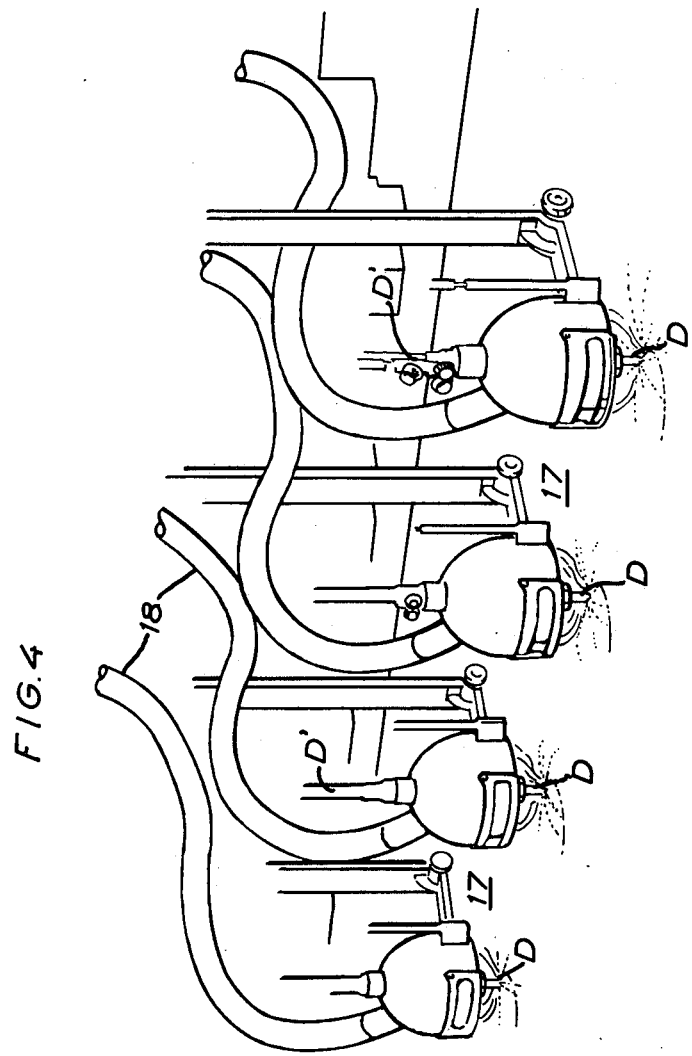

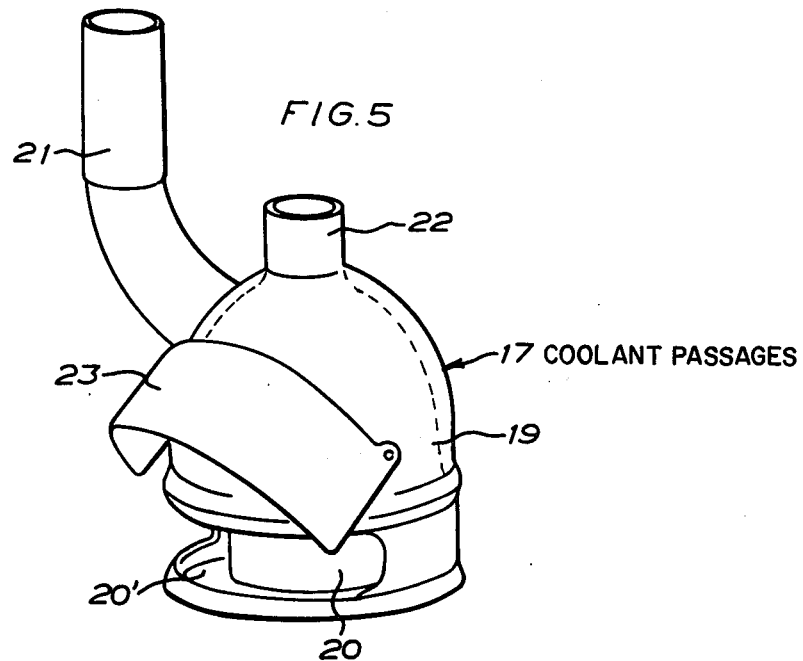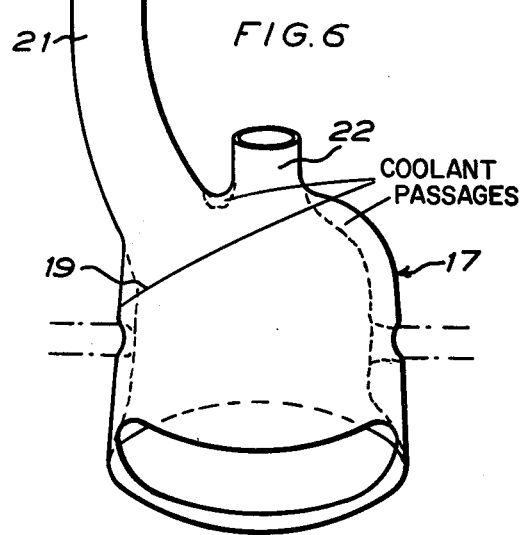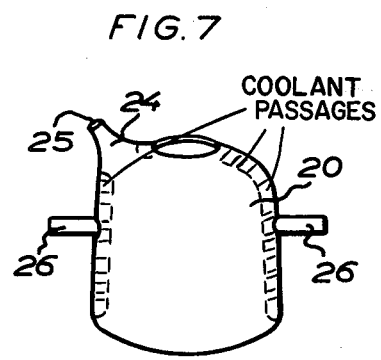

APPARATUS FOR REMOVING POLLUTING MATTER ARISING IN FLAME CUTTING AND LIKE OPERATIONS

The invention relates to an apparatus for removing polluting matter arising in flame cutting and like operations, such as fumes, dust or minute particles, which apparatus is intended for use in combination with a perforated cutting table and a cutting assembly movably arranged above the cutting table and including one or more cutter units.

In cutting operations carried out with the use of various types of cutting machines the hygienic limit values adopted for different chemical compounds are often by far exceeded.

This especially applies to the cutting of alloyed materials containing chromium, nickel etc.

That these processes at present give cause to great problems in the working environment is essentially due to the emitted dust comprising minute particles invisible to the naked eye. The smaller the size of the dust particles the greater the health risks, and measures must therefore be taken in order to solve the associated problems.

An increased general ventilation is not very efficient in spite of the large air volumes displaced, which may rather entail other environmental problems, such as draught, noise etc.

To increase ventilation must obviously be objectionable since large quantities of heated air are vented into ambient air with resultant great energy losses.

Another solution to the problems is some kind of local or spot ventilation which removes a limited air volume from around the cutting machine.

Some stationary types of spot ventilation devices for such machines have hitherto been suggested, but none of them are supplied together with the emission sources, that is, the flame cutters.

A cutting machine comprises a cutting table of a length varying between 2 and 40 meters, and the cutter supporting bar operates in a very limited range at a time. Therefore, the stationary suction devices often divide the suction profile into sections so that the removal of the dust particles by suction takes place in the section where work is momentarily carried out.

Nevertheless, a much greater air volume is sucked out with these systems than with the apparatus according to the present invention.

The object of the invention is to optimize a function which is primarily intended to eliminate/minimize polluting matter emitted by cutting machines while paying due attention to the following secondary conditions: low energy consumption (small sucked-out air volumes and low fan operating costs), low noise level, suitable temperature conditions in the working area and facilitation of the work cycles of the machines etc.

To satisfy the above conditions the suction device must be movable and follow the movements of the cutters on the longitudinally movable cutter supporting bar.

This is the most essential difference between the present invention and all of the earlier suggested apparatuses which are of the stationary type and require very large outgoing air flows in order to provide an appreciable efficiency.

According to the invention, a suction hood is associated with each of the cutter units of the cutting assembly and connected to a suction device, an upwardly facing suction box is disposed beneath the cutting table, extends transversely of the width of said table and is movable along it, said suction box being connected to the suction device and displaceable together with the cutting assembly with the aid of a device operable by sensing means sensing the position of the cutting assembly so that said box will be located beneath the working area of said cutting assembly, and the movable suction box is provided with means for reducing the speed of jets directed from the flame cutters towards the interior of said suction box and laden with gases, fumes, dust, minute particles and like polluting matter.

The following advantages are gained by the apparatus according to the invention.

It eliminates/minimizes the dust and gases produced in cutting and like operations.

It facilitates the operations carried out in cutting machines by conveying slag and cut-out small details to special boxes or conveyor belts outside the cutting table.

It cools the very hot working area around a cutting machine to the desired fixed working temperature.

It permits indicating the rated power with regard to the requisite flow of outgoing air for the respective suction unit, that is, the upper or lower suction means, as they are spaced definite maximum distances from the flame cutters.

On the basis of experiments made it is possible to indicate the optimum flow of outgoing air with regard to efficient collection of polluting matter, heat economy, noise level etc. and in relation to the amount of spent gases (acetylene, oxygen, etc.). It is presupposed, in addition to said maximum distances, that a relatively constant temperature can be maintained in the components of the apparatus.

By the insertion of heat exchangers in the conduits leading from the apparatus, the heat generated in the cutting operation can be recovered from the hot gases and the cooling water, respectively, whereby energy is saved.

An embodiment of the invention will be more fully described with reference to the accompanying drawings in which:

FIG. 3 is an enlarged section of a suction drum which is part of the lower unit;

FIG. 4 is a view of part of the cutting table as seen obliquely from above, and upper suction units disposed on the flame cutters;

FIG. 5 is a view, on a larger scale, of one of the upper suction units;

FIGS. 6 and 7 are views of details incorporated in said units.

Figure 1:
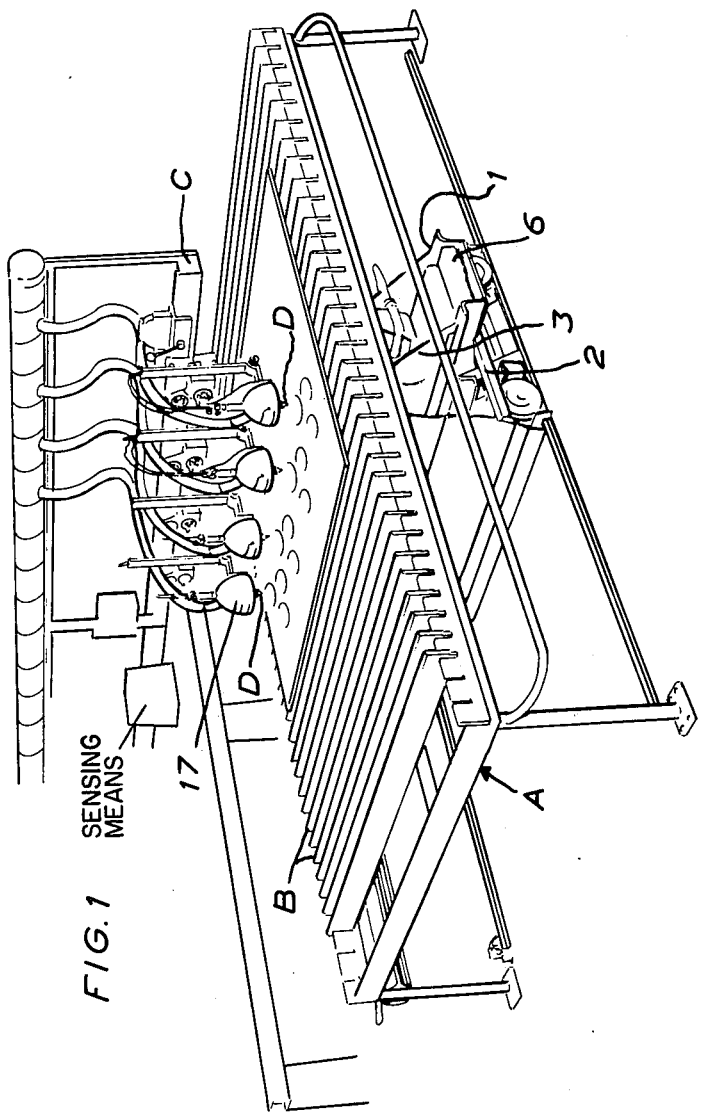
FIG. 1 is a perspective view of a cutting table with an apparatus according to the invention, as seen obliquely from the side.
Figure 2:
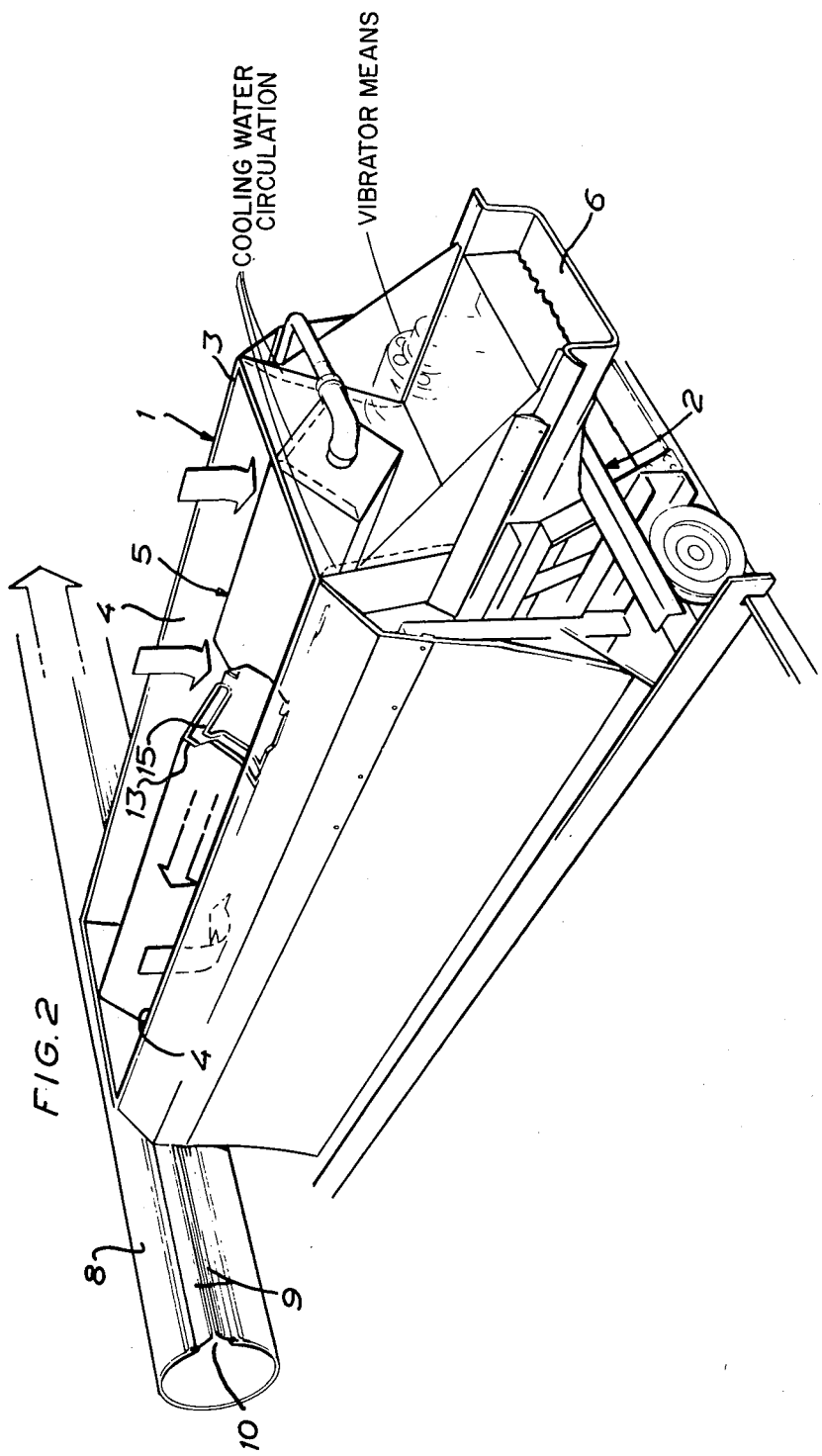
FIG. 2 is a perspective view, on a larger scale, of the lower unit of the apparatus as seen from one end thereof, certain parts having been cut open, while other parts have been illustrated as transparent for greater clarity.

The cutting table, which forms no part of the present invention, comprises a frame A which is supported by legs and across which there extend a plurality of bars B supporting the material to be cut. The cutting table resembles a grid with rather widely spaced members.

The apparatus according to the invention comprises two units which are movable along the cutting table together with the flame cutters D which are supported by transverse bar C, FIG. 6.

The lower suction unit 1 includes an open-top box 3 which is supported on a carriage 2 and has inclined walls. The upper box opening extends transversely of the width of the cutting table A and over part of its length. The suction drum 5, which will be described hereinbelow, is disposed in the box 3. The bottom of the box is formed by a vibratory chute 6 which is elastically mounted with respect to the box walls and projects from one end of the box 3, where it forms a discharge opening for cut-off pieces, slag lumps and the like.

As the vibratory chute is extended outside the box, which is of a width adapted to the cutting table, material shaken out will fall laterally of the cutting table and not encumber the rails for the box-supporting carriage 2 on the floor beneath the cutting table.

The suction drum 5 shown in cross section in FIG. 3 has at one end a closed end wall and at the other end a nozzle 7 adapted to cooperate with a suction pipe 8 disposed along one side of the cutting table and formed with an elongated aperture 10 which in the unactuated state is closed by elastic ribs 9. The interior of the suction drum 5 thus is in communication via the nozzle 7 with the suction pipe irrespective of the position to which the box has been moved.

The suction drum comprises a V-shaped lower portion 11 which has elongated recesses or gaps 12 along its two edges, and an oppositely directed V-shaped upper portion 13 the edges 14 of which project in the manner of a roof over the edges of the lower portion 11. As will appear from FIG. 3 the upper portion 13 is double-walled so that a space 15 is formed therein. In the event that the upper portion should be too heavily heated by the superposed flame cutters D indicated by dash lines, water, air or other coolant can be flown through the space 15. The portion 13 may also be supplemented with insulating and sound-damping material.

By reason of its configuration the suction drum 5 will deflect the hot gas streams from the cutters D toward both sides or either side. Mention should here be made of the fact that the control of the lower suction unit shall be so adjusted that the center of the upper drum portion 13 will always be located within an approx. 5 cm wide area X opposite the burners D.

When the hot gas streams have been deflected toward the sides they will impinge on the walls 4 of the box 3 and be directed obliquely inwardly and downwardly. As a result, the gases collect in the lower portion of the box 3, and thermal buoyancy will cause them to rise from there along the sides of the lower drum portion 11 to be caught by the edges 14 and sucked into the drum through the gaps 12.

Large and heavy particles fall onto the vibratory chute 6 from which they are carried away in the manner indicated.

The apertures or gaps 12 are so dimensioned that a uniform suction is obtained throughout the length of the drum. The gaps 12 can also be provided with adjustable sliding panels or like elements to permit manual control if for instance the need for suction is expected to be great at a given section of the drum because of several cutters being concentrated to that section. It is customary, however, to give the gaps an increasing area as counted from the nozzle 7.

Water spraying nozzles can be arranged in the box 3 to reduce dust formation and improve cooling. The walls of the box as well as the vibratory chute should be so conformed as to dampen noise, vibrations and the like. This can be done by covering them with insulating material.

As shown in FIG. 4, each of the upper suction units includes a hood 17 which is associated with the respective flame cutter D. Said hoods 17 are connected by hoses 18 to a suction line (not shown).

Each of the hoods 17 comprises an outer portion 19 and an inner portion 20. The outer portion 19 is provided with a connecting socket 21 for the hose 18 and with a lead-in 22 for the cutter stem D'. The lead-in 22 has a locking screw or like means.

Moreover, in the preferred embodiment the outer portion 19 is provided with a panel 23 in the form of a visor which makes for greater accessibility of the cutters and permits controlling the function thereof during operation. The visor or panel 23 may consist of or be provided with colored glass so that the flame cutter can be studied during operation without the use of protective glasses.

The inner portion 20 is so conformed that an interstice 20' is provided between it and the outer portion. The inner portion is mounted in such a way that the lower edge of the outer portion protrudes outwardly of that of the inner portion.

The air-borne polluting matter and the gases from the cutter are meant to be caught by the outer portion and sucked away through the hose via the interstice 20' between said portions. To obtain a uniform suction effect around the entire lower part of the hood said inner portion 20 has a projection 24 extending into the connecting socket 21 and balancing the gas and air flows.

The major part of the sucked-away air and gases will pass through the interstice 20' between the inner and outer portions 20, 19. To bring about cooling of the cutter stem and to evacuate the inner portion 20 the projection 24 may be provided with an aperture 25 through which air can be sucked also via the inner portion 20.

In cutting operations which generate intense heat it may be necessary to arrange for a further cooling of the hoods 17. An improved cooling also results in that the temperature of the gas and air mixture in the hoses will sink, which favourably affects the life of the hoses.

By making the inner portion 20 of the hood 17 double-walled, as is shown by dash lines in FIG. 7, and by conforming the fastening screws 26 protruding from the hoods as pipes, coolant can be flown through the inner portion 20 to cool said portion and the gas/air sucked past it as well as to prevent overheating of the cutter stem. The outer portion 19 can also be cooled with water.

The possibility of equipping the apparatus with a cooling system involves the advantage that the temperature can be stabilised both in the suction drum and the hoses of the hoods, whereby the volume to be sucked away can be very accurately determined. As a result, the rated power of the apparatus can be accurately indicated.

Moreover, a control unit is associated with the apparatus according to the invention. According to the movement of the flame cutter supporting bar said control unit produces a movement of the carriage supporting the box and the suction drum therein. Sensing of the position of the cutter supporting bar preferably takes place electrically. The sensing means controls a mechanism which brings about the requisite movement of the carriage 2 The hoods 17 do not require any special adjusting device as they are secured to the flame cutters.

While a preferred embodiment of the invention has been described above and shown in the accompanying drawings, those skilled in the art will realise that various modifications may be resorted to within the spirit and scope of the appended claims.

What I claim and desire to secure by Letters Patent is:

1. An apparatus for removing polluting matter arising in flame cutting and like operations, such as fumes, dust or minute particles, said apparatus being intended for use in combination with a perforated cutting table and a cutting assembly movably arranged above the cutting table and including one or more cutter units, wherein a suction hood is associated with each of the cutter units of the cutting assembly and connected to a suction device, an upwardly facing suction box disposed beneath the cutting table extends transversely of the width of said table and is movable along it, said suction box being connected to the suction device and displaceable together with the cutting assembly with the aid of a device operable by sensing means sensing the position of the cutting assembly so that said box will be located beneath the working area of said cutting assembly, and the movable suction box is provided with means for reducing the speed of jets directed from the flame cutters towards the interior of said suction box and laden with gases, fumes, dust, minute particles and like polluting matter.

2. An apparatus as claimed in claim 1, wherein the movable suction box beneath the cutting table has at least in its upper portion upwardly and outwardly inclined walls, a suction drum is disposed in said suction box to extend along it and has a roof portion formed by two outwardly inclined surfaces and a bottom portion formed preferably by two inwardly inclined surfaces, the lower edges of the roof portion protrude outwardly of the edges of the bottom portion which are connected to the roof portion, and from an upwardly direction said lower roof portion edges define suction openings located close to said connection edges, and the suction drum is spaced such a distance from the upper opening and side walls of the box that gaps are formed between the protruding edges of the roof portion and the box walls, the angles of inclination of the said walls and the roof portion being so chosen that jets directed toward said parts are alternately deflected, under reduction of speed, now toward one part now toward the other part past the said gaps to the area beneath the drum, from which evacuation takes place.

3. An apparatus as claimed in claim 1 or 2, wherein the suction drum in the movable box and preferably also the walls of said box are provided with cooling means.

4. An apparatus as claimed in claim 3, wherein the wall portions of the suction drum and the box walls which require cooling are provided with spaces through which coolant flows.

5. An apparatus as claimed in claim 1, wherein the suction hoods associated with the cutter units are provided with cooling means, preferably in the form of coolant passages formed in the hood walls.

6. An apparatus as claimed in claim 1, wherein the suction hoods are provided with openable visors.

7. An apparatus as claimed in claim 1, wherein each of the suction hoods fully surrounds the respective cutter unit and, in operative position, is located with its lower edge close to the material being cut.

8. An apparatus as claimed in claim 1, wherein the suction hoods each comprise an outer part and an inner part between which parts there is provided an interstice for leading off the polluting matter and the spent gases from around the cutters, and at least the inner part is formed with a space for flowing coolant therethrough.

9. An apparatus as claimed in claim 1, wherein the bottom of the movable box consists of a surface sealingly connected to the box walls and operable by a vibrator or like means, and the vibrator is intended to convey material falling onto the bottom surface toward one end of the box and to deliver it outside one edge of the cutting table.

* * * * *